United States Patent [19]

Formosa, Jr.

[11] 4,398,064
[45] Aug. 9, 1983

[54] CALL-FOR-SERVICE AND CONTINUITY SENSOR CIRCUIT

[75] Inventor: Edward A. Formosa, Jr., Elmhurst, Ill.

[73] Assignee: GTE Automatic Electric Labs Inc., Northlake, Ill.

[21] Appl. No.: 335,004

[22] Filed: Dec. 28, 1981

[51] Int. Cl.³ .................... H04M 7/14; H04Q 3/62
[52] U.S. Cl. ........................................ 179/18 AH
[58] Field of Search ...... 179/18 AH, 16 AA, 175.2 C

[56] References Cited

U.S. PATENT DOCUMENTS 4,190,745  2/1980  Jusinskas, Jr. et al. ........ 179/18 AH
4,310,725  1/1982  Mehaffey ...................... 179/18 AH

*Primary Examiner*—Thomas W. Brown
*Attorney, Agent, or Firm*—Robert J. Black; Charles A. Doktycz

[57] ABSTRACT

A "call-for-service" and continuity sensor circuit for use with a trunk circuit of a digital PABX telephone system interfacing with a central office via ground start signaling providing for detection of a "call-for-service" signal to the PABX by the central office. This circuit also provides high and closely matched tip to ground and ring to ground impedances for all trunk conditions in order to prevent excess loading of the trunk circuit. This circuit provides a precise and stable threshold detection level necessary for accurate sensing of the trunk circuit conditions mentioned above despite parasitic leakage current, induced longitudinal power line voltages, and earth potentials sometimes found to exist on the line connecting the central office to the PABX.

9 Claims, 1 Drawing Figure

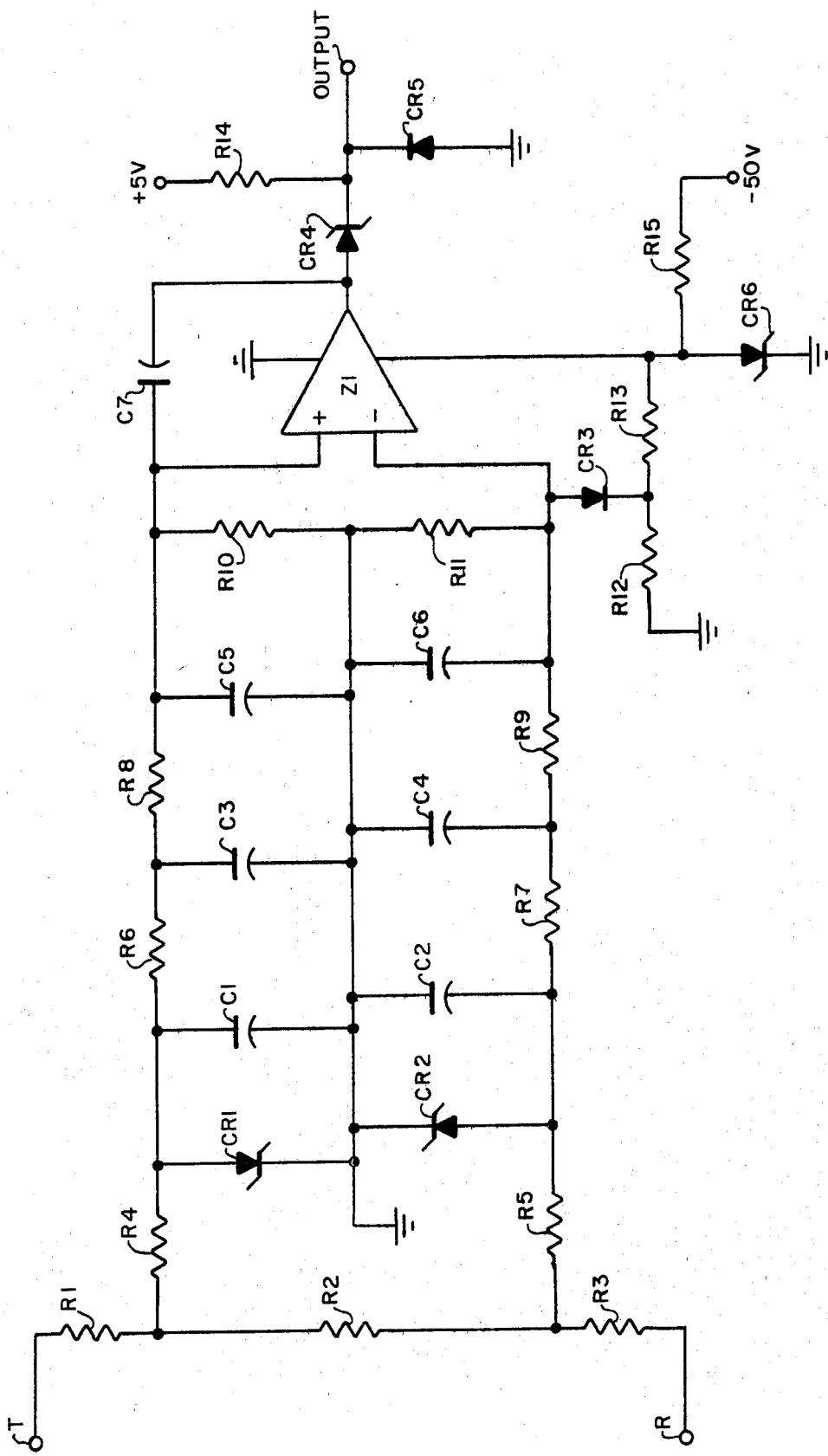

CALL-FOR-SERVICE AND CONTINUITY SENSOR CIRCUIT

BACKGROUND OF THE INVENTION (1) Field of the Invention:

The present invention relates to telephone trunk circuits and more particularly to a sensor circuit for use in a digital private automatic branch exchange (PABX), to detect supervisory signals between a central office and a PABX. The present circuit, designed for inclusion in a PABX trunk circuit, provides detection of incoming "call-for-service" signals in a ground start configuration and detects continuity of the loop between the central office and the PABX trunk circuit.

(2) Description of the Prior Art:

In a telephone system it is necessary that supervisory signals be sent via a trunk circuit from a PABX to a central office and from a central office to a PABX. For example, one of these signals indicates a request to be served or "call-for-service" from a central office to a PABX. This signaling is accomplished by applying an earth ground to the tip lead of the trunk circuit at the central office.

Existing trunk circuits typically sense the application of such supervisory signals by the use of polar relays. Such polar relays are expensive, require relatively large amounts of space and are generally of lower impedance than desirable. Polar relays are generally unusable for trunk circuits and electronic digital PABX's because of their size, low impedance, and slow speed of operation.

A partial solution to these problems is taught by U.S. Pat. No. 3,849,605, issued Nov. 19, 1974, to Stanley L. Russell. This patent demonstrates the use a high voltage bridge rectifier circuit, and an optical coupler including a light emitting diode and photo-sensitive transistor. The circuit described therein teaches only a continuity sensor. Furthermore, the solid state continuity check circuit described in the Russell patent must be switched into and out of the tip and ring loop by the operation of switching relays in order to avoid distortion during voice transmission. This solution is undesirable because it exhibits a low bridging impedance and must be removed from the loop for transmission purposes and secondly because it is dependent upon the slower operation of relay contacts.

Another solution to these problems is taught by U.S. Pat. No. 4,190,745, issued Feb. 26, 1980, to Julius Jusinskas, Jr., et al. This circuit teaches "call-for-service" detection and continuity sensing through the use of a full wave bridge rectifier and series connected resistances bridged across the central office loop. The full wave bridge rectifier output feeds plural optical couplers which derive the needed signals. Such a method is undesirable in that it lacks immunity from 60 hertz induced longitudinal voltages in the supervisory mode and introduces excessive longitudinally induced 60 hertz noise onto the transmission pair in the transmission mode. Further this circuit requires the use of non-standard optical couplers and actively trimmed resistors in order to operate within its design requirements. Accordingly, it is the object of the present invention to provide a new and improved "call-for-service" and continuity sensor circuit that overcomes the above noted objections.

SUMMARY OF THE INVENTION

The present invention consists of a sensor circuit for use in an electronic PABX trunk circuit for monitoring continuity of the loop between the PABX and the central office, and for detecting a "call-for-service" from the central office to the PABX. This circuit includes an input stage presenting a high impedance to the central office loop, and conditioning signals from the loop's tip and ring conductors for use as input to a sensing stage. The input stage further provides protection of subsequent circuitry from excessive line voltages and filters of 60 hertz longitudinally induced voltages. Finally, the input stage prevents longitudinally induced voltages from introducing noise onto the central office loop by presenting such voltages with very closely matched tip to ground and ring to ground impedances.

A sensing stage is connected between the input stage and an output stage. This stage monitors continuity of the loop between the central office and the PABX and, by analyzing input stage signals, determines when the central office has placed a "call-for-service" signal on the loop. Upon detecting each of the above mentioned conditions the sensing stage will operate its output to indicate such states to an output section as described below.

The output section level shifts signals from the sensing stage and conditions them for input to PABX central processing circuitry.

In operation, the sensor is bridged across the central office loop where it monitors the loop's tip and ring leads. The sensor will interpret the condition of a tip lead which is open circuited at the central office and a ring lead which is connected to central office negative battery as an idle condition.

The central office may signal a "call-for-service" to the PABX by connecting central office ground to the tip lead while maintaining central office negative battery on the ring lead. This condition is interpreted by the sensor of the present invention as incoming trunk seizure.

A third state recognizable by the present invention is that of an open circuit on both tip and ring sensor inputs. This condition is representative of an open circuit fault which may occur on circuit connections between a PABX and a central office. The first mentioned condition is signaled to the PABX by driving the sensor's output to a logical zero state. The latter two conditions are signaled to the PABX by driving the detector's output to a logical one state.

DESCRIPTION OF THE DRAWING

The single sheet drawing included herewith comprises a schematic diagram of a "call-for-service" and continuity sensor embodying the operational principles of the present invention.

DESCRIPTION OF THE PREFERRED EMBODIMENT

The included drawing schematically shows the "call-for-service" and continuity sensor circuit of the present invention connected between the T (tip) and R (ring) leads of a ground start trunk circuit connecting a PABX to a telephone central office. The sensor circuit includes an input section connected between the trunk circuit T and R leads and a sensing section which is connected to an output section. The output section is connected to PABX control circuitry.

The input section includes resistors R1 through R3 connected in series across the trunk circuit T and R leads forming a line bridging resistance network. Resistor R4 and capacitor C1, resistor R6 and capacitor C3, and resistor R8 and capacitor C5 form a three-stage T lead RC filter network, to the junction point of resistors R1 and R2. Resistor R5 and capacitor C2, resistor R7 and capacitor C4, and resistor R9 and capacitor C6 similarly, form a three-stage R lead RC filter network connected to the common point of resistors R2 and R3.

An excessive voltage protection network is included in each of the above described RC filters and consists of zener diodes CR1 and CR2.

Also included in the input section is a comparator input conditioning network consisting of resistors R10 through R13 and diode CR3. Resistors R10 and R11 each have one end connected to ground. Resistor R12 has one end connected to ground, and the other end connected to the cathode of diode CR3 and one end of resistor R13. The anode of diode CR3 is connected to the ungrounded end of resistor R11. The other end of resistor R13 is connected to circuitry in the sensing section as described below.

A sensing section is provided comprising comparator Z1, capacitor C7, resistor R15, and zener diode CR6. Comparator Z1 is connected to the conditioning network through its positive (+) and negative (−) inputs. Capacitor C7 is connected between an output of comparator Z1 and its positive input. A comparator voltage regulator consisting of resistor R15 and zener diode CR6 is provided within the sensing section. Resistor R15 is connected between a −50 volt PABX DC power supply (not shown) and the anode of zener diode CR6 whose cathode is connected to ground. The common point of resistor R15 and zener diode CR6 is connected to resistor R13, and to comparator Z1. Comparator Z1 also includes a connection to ground.

An output section is provided including resistor R14, diode CR5 and zener diode CR4. Resistor R14 is connected between a +5 volt PABX DC power supply (not shown) and the cathode of diode CR5 whose anode is connected to ground. Zener diode CR4 has its anode connected to the output of comparator Z1 and its cathode connected to the common point of resistor R14 and diode CR5 forming an output connection to PABX control circuitry and providing logic signals representative of detected conditions as described hereinafter.

In operation, the sensor of the present invention is connected across the central office trunk circuit T and R leads to detect an idle condition of the trunk, incoming trunk seizure, and trunk open or fault conditions. To identify the trunk as idle, two conditions must exist, namely: (1) the T lead is open at the central office, and (2) the R lead from the central office is at a negative potential. Voltage divider action of resistors R2 through R11, and voltage clamping action of resistors R12, R13 and diode CR3 cause the voltage at the positive terminal of comparator Z1 to be more negative than the voltage at the negative terminal. Comparator Z1 will thus switch its output to approximately its negative supply voltage. The output section will shift the comparator output voltage positively to a potential of approximately ground and present this to the PABX control circuitry for analysis and use.

The second detected state, that of incoming central office seizure or "call-for-service", is recognized by the sensor when the central office places a ground potential on the T lead at the central office while maintaining the R lead at the above mentioned negative potential. In response to these potentials, the input section will, through voltage divider action of resistors R1 through R11 and voltage clamping action of resistors R13 and R14 and diode CR3, make the positive terminal of comparator Z1 more positive than the negative terminal of comparator Z1. Comparator Z1 will as a result, switch its output to approximately ground. The output section will shift the comparator output positively to a potential of approximately +5 volts and present the thus shifted signal to the PABX control circuitry where it will be interpreted as central office seizure. One of the first actions usually taken by a PABX receiving central office seizure over of its two way trunk circuits is to busy that trunk circuit to outgoing traffic generated within the PABX. Such busying prevents calls from being "pocketed" due to the PABX selecting a circuit from which the call cannot be extended.

The third detected state, that of central office loop open, is recognized by the sensor of the present invention when open circuits are seen on both T and R leads. In response to the open lead conditions, the input stage will, through voltage divider action of resistor R2 and resistors R4 through R11, together with voltage biasing action of resistors R12 and R13 and diode CR3, condition comparator Z1's negative input terminal more negative than its positive input terminal, causing comparator Z1 to drive its output up toward ground. The output section will then shift comparator Z1's near-ground output signal in a positive direction, producing an output signal of approximately +5 volts for the PABX control circuitry in response to a central office loop open condition. This condition, when recognized by the PABX control circuitry, will cause that circuitry to busy the associated trunk's outgoing access to PABX originated traffic, thereby preventing calls originating in but destined for points outside of the PABX from being pocketed.

The sensor's immunity to 60 hertz induced longitudinal voltages is obtained by means of resistors R4 through R9 and capacitors C1 through C6. These components form separate three-stage RC filters for signals from the T and R leads and thus permit the sensor to operate correctly in the presence of all allowable longitudinally induced voltages.

Zener diodes CR1 and CR2 clamp sensed potentials and enable the detector to work with boosted central office batteries while protecting succeeding circuitry from excessive voltages. The need to switch the sensor out of the transmission circuit in the supervisory or talking mode is obviated by the high input impedance of the sensor's input stage. Capacitor C7 is connected as a positive feedback element across comparator Z1 and used to add hysteresis to the sensor, thereby eliminating comparator output changes due to minor comparator input variations.

Although the preferred embodiment of the invention has been illustrated, and described in detail, it will be readily apparent to those skilled in the art that various modifications may be made therein without departing from the spirit of the invention which shall be limited only by the scope of the appended claims.

What is claimed is:

1. A call-for-service and continuity sensor circuit for use in a trunk circuit of a telephone switching system including at least first and second switching centers connected via said trunk circuit in ground start configuration, said trunk circuit having first and second leads connecting said switching centers, said call-for-service and continuity sensor circuit comprising:

circuit input means including signal conditioning means connected to said first and said second leads of said trunk circuit;

circuit sensing means including comparator means connected via included inputs to said signal conditioning means;

said input means cooperating with said signal conditioning means to adapt signals sensed on said trunk circuit leads for use by said comparator means while protecting said trunk circuit from excessive loading and protecting said comparator means from excessive induced potentials; and circuit output means connected to an output of said comparator means and having an output connected to said second switching center, said circuit output means operated to convert signals from said comparator means to signals suitable for use by said second switching center and to couple said suitable signals to said second switching center via an output terminal;

whereby, in response to the application of negative potential to said second lead and an open circuit to said first lead at said first switching center, said sensor is operated to produce a first output signal to said second switching center, and in response to the application of negative potential to said second lead and earth ground to said first lead at said first switching center, said sensor is further operated to produce a second output signal, and in response to the application of an open circuit to both of said leads at said first switching center, said sensor is still further operated to produce said second signal.

2. A call-for-service and continuity sensor as claimed in claim 1, wherein: said circuit input means includes line bridging means comprising a plurality of resistors connected across said first and second leads, providing access to signals on said leads while protecting said leads from excessive loading.

3. A call-for-service and continuity sensor as claimed in claim 1, wherein: said circuit input means includes filter means comprising a plurality of three-stage RC filters each connected to a different common point of said bridging means resistors, said filters operated to prevent signals induced on said trunk circuit leads from interfering with the operation of said comparator means.

4. A call-for-service and continuity sensor as claimed in claim 1, wherein: said signal conditioning means comprises a biasing network connected between said trunk circuit leads and said comparator means, said signal conditioning means operated to adapt said lead signals for sensing by said comparator means.

5. A call-for-service and continuity sensor as claimed in claim 1, wherein: said circuit sensing means includes feedback means connected between said comparator means output and an input of said comparator means, said feedback means operated to prevent fluctuations on said comparator means inputs from causing changes of said comparator means output.

6. A call-for-service and continuity sensor as claimed in claim 1, wherein: said sensor means further includes voltage regulation means comprising a resistor and regulator diode connected in series, said voltage regulation means operating to supply a controlled potential to said comparator means.

7. A call-for-service and continuity sensor as claimed in claim 1, wherein: said circuit output means further comprises bias and clamping means, and level shifting means connected between said comparator means output and said bias and clamping means, said level shifting means operated to shift the level of said comparator means output signal and said bias and clamping means operated to restrict said level shifted comparator means output signals within predefined limits suitable for use by said second switching center.

8. A call-for-service and continuity sensor as claimed in claim 7, wherein: said level shifting means comprises a diode.

9. A call-for-service and continuity sensor as claimed in claim 7, wherein: said bias and clamping means comprises a resistor and diode connected in series.

* * * * *